United States Patent
Lee et al.

(10) Patent No.: US 8,388,897 B2
(45) Date of Patent: Mar. 5, 2013

(54) SYSTEM FOR REDUCING CARBON COMPOUND OF HEAT ENGINE

(75) Inventors: Byung Chan Lee, Jeollanam-do (KR); Yong-Sik Jang, Jeollanam-do (KR)

(73) Assignees: Byung Chan Lee, Jeollanam-do (KR); Yong-Sik Jang, Jeollanam-do (KR)

( * ) Notice: Subject to any disclaimer, the term of this patent is extended or adjusted under 35 U.S.C. 154(b) by 315 days.

(21) Appl. No.: 12/810,215

(22) PCT Filed: Dec. 29, 2008

(86) PCT No.: PCT/KR2008/007734
§ 371 (c)(1), (2), (4) Date: Jun. 23, 2010

(87) PCT Pub. No.: WO2009/084887
PCT Pub. Date: Jul. 9, 2009

(65) Prior Publication Data
US 2010/0284866 A1   Nov. 11, 2010

(30) Foreign Application Priority Data
Dec. 27, 2007 (KR) .......................... 10-2007-0138706

(51) Int. Cl.
*B01D 50/00* (2006.01)
(52) U.S. Cl. ........................................... 422/168
(58) Field of Classification Search ................. 422/168; 423/210; 110/345
See application file for complete search history.

(56) References Cited

U.S. PATENT DOCUMENTS
2007/0032380 A1* 2/2007 Anthony et al. .............. 502/400

FOREIGN PATENT DOCUMENTS
| KR | 10-0185288 | 12/1998 |
| KR | 10-0324709 B1 | 10/2000 |
| KR | 10-0403121 B1 | 10/2003 |

OTHER PUBLICATIONS
International Search Report of PCT/KR2008/007734, dated Jul. 24, 2009.

* cited by examiner

Primary Examiner — Tom Duong
(74) Attorney, Agent, or Firm — Duane Morris LLP

(57) ABSTRACT

A system for reducing a carbon compound of a heat engine includes: an outlet pipe transferring and outputting an exhaust gas from the heat engine; a removal reacting tank connected to the outlet pipe, the removal reacting tank generating a strong alkaline solution by a reaction of a resource material and a water and removing the carbon compound from the exhaust gas by a contact of the carbon compound and the strong alkaline solution; a sludge storing tank storing a sludge generated by a removal reaction in the removal reacting tank; and a decomposing tank generating the resource material for the removal reacting tank by decomposing the sludge from the sludge storing tank with a heat. Accordingly, since the carbon compound such as carbon dioxide is effectively removed from the exhaust gas emitted from a heat engine equipped in an industrial plant and a vehicle, atmospheric environmental pollution is prevented and regulation on carbon dioxide emission is satisfied.

23 Claims, 1 Drawing Sheet

SYSTEM FOR REDUCING CARBON COMPOUND OF HEAT ENGINE

CROSS-REFERENCE TO RELATED PATENT APPLICATIONS:

The present application is a U.S. national stage application under 35 U.S.C. §371 of PCT Application No. PCT/KR2008/007734, filed Dec. 29, 2008, which claims priority to KR 10-2007-0138706 filed on Dec. 27, 2007, the entireties of which are incorporated by reference herein.

TECHNICAL FIELD

The present invention relates to a system for reducing a carbon compound, and more particularly, to a carbon compound reduction system where a carbon compound such as a carbon dioxide in an exhaust gas from a heat engine is effectively and economically removed by circulation and recycling of resource materials.

BACKGROUND ART

In general, a heat engine generates a thermal energy by fuel combustion. The heat engine converts a portion of the thermal energy to a mechanical energy and emits the other portion of the thermal energy. For example, the heat engine includes an internal-combustion engine, an external-combustion engine and a boiler. The heat engine is used as an essential power source in an industrial plant and used as a power source in a vehicle such as an automobile, a ship and an airplane.

Since the heat engine gains the thermal energy by fuel combustion, the heat engine emits an exhaust gas resulting from fuel combustion. The exhaust gas includes various hazardous substances. For example, the exhaust gas emitted from the automobile includes the hazardous substances such as carbon dioxide ($CO_2$), carbon monoxide (CO), nitrogen compound (NO, $NO_2$) and hydrocarbon (HC). Accordingly, the exhaust gas is emitted through a purification equipment so that the hazardous substances can be converted to one of carbon dioxide ($CO_2$), water ($H_2O$) and nitrogen ($N_2$) by reaction with a catalyst such as platinum (Pt), palladium (Pd) and rhodium (Rh) in the purification equipment.

However, although the hazardous substances that are noxious to a human body are removed from the exhaust gas through the purification equipment, a carbon compound such as carbon dioxide ($CO_2$), which is one of major environmental contamination substances, is not removed from the exhaust gas.

Since carbon dioxide occupying about 60% of greenhouse gases causes a global warming, endeavor and regulation on reduction in emission of carbon dioxide have been done through a convention on climate change. Recently, as a carbon emission rights trading market has been introduced, enterprises have to buy the emission rights when they can not reduce emission of carbon dioxide to an assigned target amount. Accordingly, competitive power of the enterprises that buy the emission rights is reduced due to increase in cost. Further, since the enterprises that achieve the assigned target amount in emission of carbon dioxide sell the emission rights corresponding to the reduction amount, they make surplus profits and obtain an environment-friendly image.

As a result, although every enterprise has been made an effort on development of reduction technology in emission of carbon dioxide, a prominent reduction technology in emission of carbon dioxide that is satisfactory in view of efficiency, economy, industrial utilization and field application is not developed.

In addition, a heat engine generally reuses a portion of the thermal energy having a temperature of about 1000° C. and the other portion of the thermal energy is emitted. Accordingly, the emitted heat energy of a relatively high temperature causes the greenhouse effect and the global warming with waste of energy.

DISCLOSURE OF INVENTION

Technical Problem

Accordingly, the present invention is directed to a system for reducing a carbon compound of a heat engine that substantially obviates one or more of the problems due to limitations and disadvantages of the related art.

An object of the present invention is to provide a system for reducing a carbon compound of a heat engine that has excellent energetic and economical efficiencies.

Another object of the present invention is to provide a system for reducing a carbon compound of a heat engine where the carbon compound such as carbon dioxide in an exhaust gas is effectively removed and the carbon compound of a relatively high purity is separately collected and reused.

Another object of the present invention is to provide a system for reducing a carbon compound of a heat engine where waste of energy is prevented by reusing a thermal energy of a relatively high temperature effectively.

Technical Solution

A system for reducing a carbon compound of a heat engine includes: an outlet pipe transferring and outputting an exhaust gas from the heat engine; a removal reacting tank connected to the outlet pipe, the removal reacting tank generating a strong alkaline solution by a reaction of a resource material and a water and removing the carbon compound from the exhaust gas by a contact of the carbon compound and the strong alkaline solution; a sludge storing tank storing a sludge generated by a removal reaction in the removal reacting tank; and a decomposing tank generating the resource material for the removal reacting tank by decomposing the sludge from the sludge storing tank with a heat.

Preferably, the system further includes a resource material storing tank storing the resource material from the decomposing tank and providing the resource material to the removal reacting tank.

Preferably, the system further includes a carbon dioxide collecting tank storing a carbon dioxide generated by a decomposition reaction in the decomposing tank.

Preferably, the strong alkaline solution is provided from the removal reacting tank to the decomposing tank and the decomposing tank generates the resource material and the water by decomposing the strong alkaline solution with a heat.

Preferably, the system further includes: a third transferring pipe transferring the carbon dioxide generated by a decomposition reaction in the decomposing tank to the carbon dioxide storing tank; and a filtering means in the third transferring pipe, the filtering means filtering the resource material and passing the carbon dioxide.

Preferably, the system further includes: an extracting pipe transferring the strong alkaline solution of the removal reacting tank to the outlet pipe prior to the removal reacting tank such that the exhaust gas contacts the strong alkaline solution in the outlet pipe; and a transfer driving means supplying a transfer driving force such that the strong alkaline solution is transferred through the extracting pipe.

Preferably, the system further includes an injecting nozzle subdividing and injecting the strong alkaline solution transferred through the extracting pipe into the outlet pipe.

Preferably, the system further includes a transferring means transferring the sludge from the removal reacting tank to the sludge storing tank.

Preferably, the removal reacting tank includes: a water supplying part through which the water is supplied; and a resource material supplying part through which the resource material is supplied.

Preferably, the removal reacting tank includes a contact rate improving means that improves a contact rate between the strong alkaline solution and the exhaust gas.

Preferably, the contact rate improving means includes one of a rotating means for rotating the strong alkaline solution, a stirring means for stirring the strong alkaline solution, a gas subdividing means for subdividing and injecting the exhaust gas and an aerating means for aerating and injecting the exhaust gas.

Preferably, the system further includes: a filtering means disposed in the outlet pipe posterior to the removal reacting tank, the filtering means filtrating and collecting the sludge from the exhaust gas; and a bypass pipe transferring the sludge collected by the filtering means to the sludge storing tank.

Preferably, the sludge is stored in the sludge storing tank as a sludge state or a solid state by drying with a heat.

Preferably, the sludge storing tank includes a sludge outputting part for outputting the sludge therein.

Preferably, the sludge storing tank dries the sludge with the heat from the heat engine.

Preferably, the resource material storing tank includes a resource material outputting part for outputting the resource material.

Preferably, the system further includes a fourth transferring pipe through which the carbon dioxide in the removal reacting tank is transferred to the outlet pipe.

Preferably, the decomposing tank decomposes the sludge with the heat from the heat engine.

Preferably, the system further includes: an auxiliary decomposing tank decomposes the strong alkaline solution from the removal reacting tank with a heat to generate the resource material and the water; and a fifth transferring pipe through which the strong alkaline solution is transferred from the removal reacting tank to the auxiliary decomposing tank.

Preferably, the auxiliary decomposing tank decomposes the strong alkaline solution with the heat from the heat engine.

Preferably, the water of a vapor state generated by a decomposition reaction in the auxiliary decomposing tank is outputted for recycling to one of the removal reacting tank and an exterior.

Preferably, the heat engine includes one of an internal-combustion engine, an external-combustion engine, a boiler and a flue.

Preferably, the resource material includes a quicklime, the strong alkaline solution includes a calcium hydroxide, and the sludge includes a calcium carbonate.

Preferably, the strong alkaline solution includes one of a calcium hydroxide, a sodium hydroxide and a potassium hydroxide.

Advantageous Effects

In a system for reducing a carbon compound of a heat engine according to the present invention, since a carbon compound such as carbon dioxide in an exhaust gas emitted from a heat engine equipped in an industrial plant and a vehicle is effectively removed, air pollution is prevented and a regulation of carbon dioxide emission is easily satisfied.

In addition, since resource materials for removing the carbon compound are circulated and recycled, the resource materials are sufficiently utilized. Accordingly, economical efficiency is improved by material cost reduction.

Further, since various valuable by-products such as calcium carbonate ($CaCO_3$), carbon dioxide ($CO_2$), calcium oxide (quicklime: CaO) and high temperature steam are obtained, economical efficiency is further improved.

Moreover, since a thermal energy of a relatively high temperature is used for recycling the resource materials, a retrieve rate of thermal energy is maximized and energy waste is prevented.

BRIEF DESCRIPTION OF DRAWINGS

The accompanying drawings, which are included to provide a further understanding of the invention and are incorporated in and constitute a part of this specification, illustrate embodiments of the invention.

MODE FOR THE INVENTION

Figure 1:
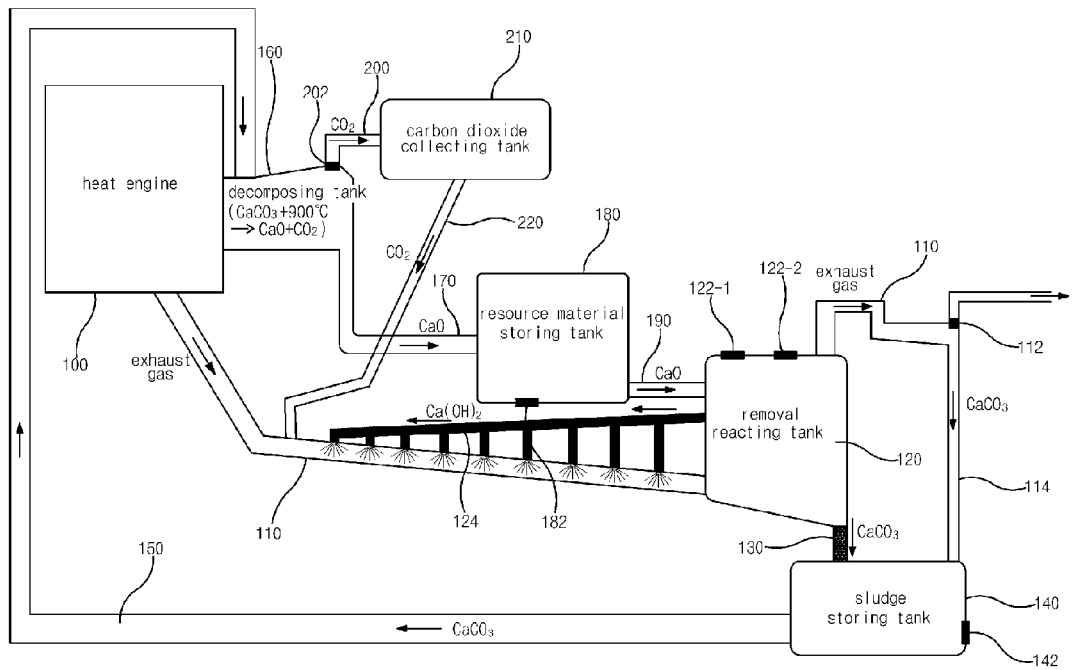
FIG. 1 is a view showing a system for reducing a carbon compound of a heat engine according to a first embodiment of the present invention.

FIG. 1 is a view showing a system for reducing a carbon compound of a heat engine according to a first embodiment of the present invention.

In FIG. 1, calcium oxide (quicklime: CaO) of a resource material reacts with hydrogen oxide (water: $H_2O$) to form a strong alkaline solution including calcium hydroxide ($Ca(OH)_2$), and a carbon compound such as carbon dioxide ($CO_2$) in an exhaust gas emitted from a heat engine 100 is removed by reacting with calcium hydroxide ($Ca(OH)_2$) of the strong alkaline solution. A calcium carbonate ($CaCO_3$) sludge generated from the removal reaction is decomposed using a thermal energy of a relatively high temperature from the heat engine 100 to generate calcium oxide (quicklime: CaO) of a resource material. Accordingly, the energy is circulated and recycled with minimization of energy loss in the system according to an embodiment of the present invention. In addition, valuable by-products such as calcium carbonate ($CaCO_3$), carbon dioxide ($CO_2$) of a relatively high purity, calcium oxide (quicklime: CaO) and high temperature steam are obtained in the system according to an embodiment of the present invention.

The system for reducing a carbon compound of a heat engine according to an embodiment of the present invention includes a heat engine 100, an outlet pipe 110, a removal reacting tank 120, a sludge storing tank 140, a decomposing tank 160, a resource materials storing tank 180 and a carbon dioxide collecting tank 210. An exhaust gas emitted from the heat engine by fuel combustion is transferred through and outputted from the outlet pipe 110. The removal reacting tank 120 is connected to the outlet pipe 110 so that a carbon compound such as carbon dioxide ($CO_2$) in the exhaust gas can be removed by using a strong alkaline solution including calcium hydroxide ($Ca(OH)_2$). A calcium carbonate ($CaCO_3$) sludge is generated in the removal reacting tank 120 during the removal reaction and stored in the sludge storing tank 140. Further, the calcium carbonate ($CaCO_3$) sludge is supplied from the sludge storing tank 140 to the decomposing tank 160 and is decomposed into calcium oxide (quicklime: CaO) of a resource material and carbon dioxide ($CO_2$) by a thermal energy of a relatively high temperature in the decomposing tank 160. Calcium oxide (quicklime: CaO) of the decomposition tank 160 is stored in the resource materials storing tank 180 and supplied to the removal reacting tank 120. In addition, carbon dioxide ($CO_2$) of the decomposition tank 160 is stored in the carbon dioxide collecting tank 210.

The exhaust gas of the outlet pipe 110 passes through the removal reacting tank 120 and carbon compound such as carbon dioxide in the exhaust gas is removed by using the strong alkaline solution including calcium hydroxide ($Ca(OH)_2$) in the removal reacting tank 120. As a result, the exhaust gas contacts calcium hydroxide ($Ca(OH)_2$) and carbon dioxide ($CO_2$) in the exhaust gas is removed according to a reaction equation of "$Ca(OH)_2 + CO_2 \rightarrow CaCO_3 + H_2O$."

Calcium oxide (quicklime: CaO) of a resource material and hydrogen oxide (water: $H_2O$) are supplied to the removal reacting tank 120 from exterior. Calcium oxide (quicklime: CaO) of a resource material and hydrogen oxide (water: $H_2O$) react with each other according to a reaction equation of "$CaO + H_2O \rightarrow Ca(OH)_2$" to generate a strong alkaline solution including calcium hydroxide ($Ca(OH)_2$) of about pH 10 to about pH 12. The strong alkaline solution including calcium hydroxide ($Ca(OH)_2$) is stored in the removal reacting tank 120 and used for removing carbon dioxide ($CO_2$) in the exhaust gas.

Further, the removal reacting tank 120 includes a resource material supplying part 122-1 and a water supplying part 122-2. Basically, calcium oxide (quicklime: CaO) may be provided from the resource material storing tank 180 to the removal reacting tank 120 when reaction efficiency of quicklime and water is reduced. Additionally, new calcium oxide (quicklime: CaO) of a resource material and new water of the exterior may be supplied to the removal reacting tank 120 through the resource material supplying part 122-1 and the water supplying part 122-2, respectively, when supply by the resource material storing tank 180 is not sufficient.

Since a heat of relatively high temperature is generated during the reaction of generating calcium hydroxide ($Ca(OH)_2$), the removal reacting tank 120 has a material and a structure that stand the heat.

Moreover, the removal reacting tank 120 includes a contact rate improving means (not shown) that increases reaction speed and maximizes reaction efficiency by improving the contact rate between calcium hydroxide ($Ca(OH)_2$) and carbon dioxide ($CO_2$) of the exhaust gas. For example, the contact rate improving means may include one of a rotating means for rotating the strong alkaline solution, a stirring means for stirring the strong alkaline solution, a gas subdividing means for subdividing and injecting the exhaust gas and an aerating means for aerating and injecting the exhaust gas.

The calcium carbonate ($CaCO_3$) sludge as a by-product of reaction is generated and deposited in the removal reacting tank 120 during the removal reaction. The calcium carbonate ($CaCO_3$) sludge is transferred through a transferring means 130 from the removal reacting tank 120 to the sludge storing tank 140. The transferring means 130 transfers the removal reacting tank 120 smoothly. For example, the transferring means 130 may include a screw type rotor.

Floating materials may be generated in the removal reacting tank 120 during the removal reaction. Accordingly, the removal reacting tank 120 may include an eliminating means (not shown) for the floating materials. For example, the removal reacting tank 120 may include a scrapper.

The exhaust gas that is purified in the removal reacting tank 120 is emitted to the atmosphere through the outlet pipe 110. Since the purified exhaust gas may include a minute amount of calcium carbonate ($CaCO_3$) and calcium hydroxide ($Ca(OH)_2$), the outlet pipe 110 posterior to the removal reacting tank 120 may include a filtering means 112 that filtrates and collects calcium carbonate ($CaCO_3$) and calcium hydroxide ($Ca(OH)_2$) from the exhaust gas, and a bypass pipe 114 transferring the collected calcium carbonate ($CaCO_3$) and calcium hydroxide ($Ca(OH)_2$) from the filtering means 112 to the sludge storing tank 140 may be connected to the outlet pipe 110.

For the purpose of effectively remove carbon dioxide ($CO_2$) from the exhaust gas, calcium hydroxide ($Ca(OH)_2$) of the removal reacting tank 120 may be supplied to the outlet pipe 110 prior to the removal reacting tank 120 through an extracting pipe 124. Accordingly, the exhaust gas firstly contacts calcium hydroxide ($Ca(OH)_2$) in the outlet pipe 110 prior to the removal reacting tank 120, and secondly contacts calcium hydroxide ($Ca(OH)_2$) in the removal reacting tank 120. The extracting pipe 124 transfers calcium hydroxide ($Ca(OH)_2$) of the removal reacting tank 120 to the outlet pipe 110 prior to the removal reacting tank 120. In addition, an injecting nozzle (not shown) that subdivides and injects calcium hydroxide ($Ca(OH)_2$) into the extracting pipe 124 may be formed at an end portion of the extracting pipe 124, and a transfer driving means (not shown) such as a pump may be connected to the extracting pipe 124 for supplying a transfer driving force of pressure so that calcium hydroxide ($Ca(OH)_2$) can be transferred through the extracting pipe 124.

Further, the outlet pipe 110 prior to the removal reacting tank 120 may be formed to have a slope for preventing a backflow of the strong alkaline solution in the removal reacting tank 120 to the outlet pipe 110 prior to the removal reacting tank 120. Alternatively, a backflow preventing means (not shown) may be connected to the outlet pipe 110 prior to the removal reacting tank 120.

The calcium carbonate ($CaCO_3$) sludge generated in the removal reacting tank 120 during the removal reaction is stored in the sludge storing tank 140 as a sludge state. Alternatively, the calcium carbonate ($CaCO_3$) sludge may be dried with the heat of relatively high temperature from the heat engine 100 or from a heating means (not shown) of the system and may be stored as a solid state.

Calcium carbonate ($CaCO_3$) of the sludge storing tank 140 is transferred to the decomposing tank 160 through a sludge transferring pipe 150 by using one method of a pneumatic transfer, a hydraulic transfer, a conveyor transfer and a runoff river transfer. In addition, a sludge outputting part 142 is formed on the sludge storing tank 142, and calcium carbonate ($CaCO_3$) in the sludge storing tank 142 may be outputted through the sludge outputting part 142 for recycling. For example, calcium carbonate ($CaCO_3$) may be used as a raw material for fabrication of steel, cement or fertilizer or as an aggregate for construction. Further, the sludge may be directly provided from exterior to the sludge storing tank 140.

The decomposing tank 160 decomposes calcium carbonate ($CaCO_3$) from the sludge storing tank 140 using a heat of relatively high temperature from the heat engine 100 according to a reaction equation of "$CaCO_3$ (heating over about 860° C.)$\rightarrow CaO + CO_2 \uparrow$" to generate calcium oxide (quicklime: CaO) of a resource material and carbon dioxide ($CO_2$). Since calcium carbonate ($CaCO_3$) is decomposed by heating over about 860° C., calcium carbonate ($CaCO_3$) is sufficiently decomposed with the heat of the heat engine 100 over about 1500° C.

The decomposing tank 160 may be disposed adjacent to the heat engine 100 for smooth heat transmission from the heat engine 100 to the decomposing tank 160. In addition, the decomposing tank 160 may have a material and a structure that stand an environment of relatively high temperature and relatively high pressure.

Calcium oxide (quicklime: CaO) generated in the decomposing tank 160 during the decomposition reaction is transferred to the resource material storing tank 180 through a first transferring pipe 170, and carbon dioxide ($CO_2$) generated in the decomposing tank 160 during the decomposition reaction is transferred to the carbon dioxide collecting tank 210 through a third transferring pipe 200. For example, calcium oxide (quicklime: CaO) may be automatically transferred by a gas pressure of carbon dioxide ($CO_2$) generated in the decomposition reaction. Alternatively, calcium oxide (quicklime: CaO) may be automatically transferred by one method of a pneumatic transfer, a hydraulic transfer, a conveyor transfer and a runoff river transfer. In addition, carbon dioxide ($CO_2$) may be transferred the gas pressure thereof.

For the purpose of preventing transfer of quicklime with carbon dioxide of the decomposing tank 160 through the third transferring pipe 200, the third transferring pipe 200 may include a filtering means 202 that filters quicklime and passes carbon dioxide. Further, for the purpose of preventing a backflow of carbon dioxide of the decomposing tank 160 through the sludge transferring pipe 150, the sludge transferring pipe 150 may include a backflow preventing means (not shown) at a portion adjacent to the decomposing tank 160.

The quicklime generated from the decomposition reaction in the decomposing tank 160 is stored in the resource material storing tank 180 and the stored quick lime is provided to the removal reacting tank 120. The resource material storing tank 180 includes a resource material outputting part 182. The quicklime in the resource material storing tank 180 may be outputted to exterior through the resource material outputting part 182 and the outputted quicklime may be reused for industry and energy. In addition, the quicklime in the resource material storing tank 180 is transferred to the removal reacting tank 120 through a second transferring pipe 190 by an appropriate transferring method.

Carbon dioxide of relatively high purity generated from the decomposition reaction in the decomposing tank 160 is stored in the carbon dioxide collecting tank 210. Carbon dioxide may be stored as a compressed state or a cooled state for increasing amount of storage. Carbon dioxide in the carbon dioxide collecting tank 210 may be reused for photosynthesis in cultivation of plants or as a raw material for industry. Further, carbon dioxide in the carbon dioxide collecting tank 210 may be transferred to the outlet pipe 110 prior to the removal reacting tank 120 through a fourth transferring pipe 220 and may be removed by the removal reaction.

Figure 2:
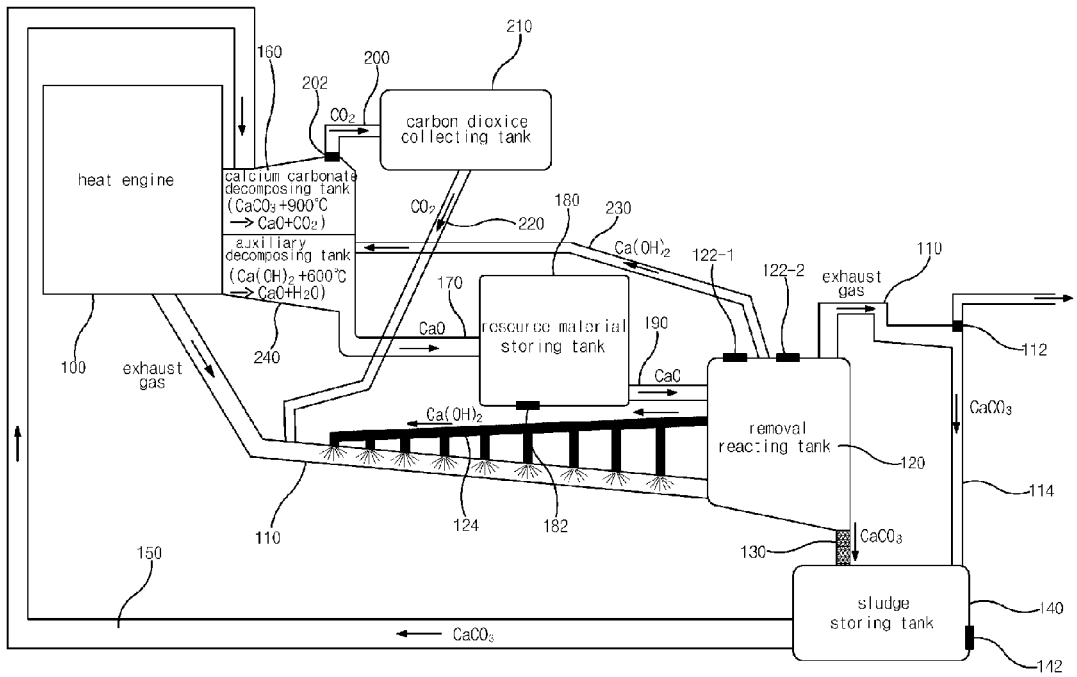
FIG. 2 is a view showing a system for reducing a carbon compound of a heat engine according to a second embodiment of the present invention.

FIG. 2 is a view showing a system for reducing a carbon compound of a heat engine according to a second embodiment of the present invention.

The system according to the second embodiment includes all elements of the system according to the first embodiment. In addition, the system according to the second embodiment further includes an auxiliary decomposing tank 240 and a fifth transferring pipe 230. Calcium hydroxide of the removal reacting tank 120 is transferred to the auxiliary decomposing tank 240 through the fifth transferring pipe 230, and the auxiliary decomposing tank 240 decomposes calcium hydroxide from the removal reacting tank 120 with the heat of relatively high temperature from the heat engine 100.

In the auxiliary decomposing tank 240, calcium hydroxide is decomposed using the heat of relatively high temperature from the heat engine 100 according to a reaction equation of "$Ca(OH)_2$ (heating over about 580° C.)$\rightarrow CaO+H_2O\uparrow$" to generate the quicklime of a resource material and the water. Since calcium hydroxide ($Ca(OH)_2$) is decomposed by heating over about 580° C., calcium hydroxide is sufficiently decomposed with the heat of the heat engine 100 over about 1500° C.

Similarly to the decomposing tank 160, the auxiliary decomposing tank 240 may be disposed adjacent to the heat engine 100 for smooth heat transmission from the heat engine 100 to the auxiliary decomposing tank 240. In addition, the auxiliary decomposing tank 240 may have a material and a structure that stand an environment of relatively high temperature and relatively high pressure.

The quicklime generated from the decomposition reaction in the auxiliary decomposing tank 240 is transferred to the resource material storing tank 180 through the first transferring pipe 170 and is stored in the resource material storing tank 180. The water of a vapor state generated from the decomposition reaction in the auxiliary decomposing tank 240 may be outputted to exterior and may be reused as a hot water or for heating. Alternatively, the water of the auxiliary decomposing tank 240 may be provided to the removal reacting tank 120 and may be reused for generating calcium hydroxide.

Although the decomposing tank 160 and the auxiliary decomposing tank 240 are separately formed in the system according to the second embodiment, a single decomposing tank may be formed in the system according to another embodiment such that the decomposition reaction of calcium carbonate and the decomposition reaction of calcium hydroxide are performed together in the single decomposing tank.

The heat engine 100 generates a thermal energy of relatively high temperature by fuel combustion. For example, the heat engine 100 may include an internal-combustion engine and an external-combustion engine converting the thermal energy of relatively high temperature to a mechanical energy. In addition, the heat engine 100 may be defined as an apparatus that emits an exhaust gas and a heat of a temperature over about 900° C. For example, the heat engine 100 may include a boiler that emits an exhaust gas and a heat of relatively high temperature without conversion into a mechanical energy. Moreover, the heat engine 100 may include a flue that is heated to relatively high temperature with emission of an exhaust gas. Accordingly, the system for reducing carbon compound according to the present invention may be formed in an industrial plant or a vehicle such as an automobile including a heat engine 100 of the above-mentioned definition The system for reducing a carbon compound according to the present invention may further include a control panel that controls entire operation of the system for automatic operation. In addition, each transferring pipe of the system for reducing a carbon compound according to the present invention may further include a valve means (not shown) opening and closing supply of flux, a manometer measuring pressure of flux and a flowmeter measuring amount of flux.

Operation of the system for reducing a carbon compound according to the present invention will be illustrated hereinafter.

Before operation, quicklime and water are provided to the removal reacting tank 120, and the strong alkaline solution including calcium hydroxide is generated by the reaction of quick lime and water in the removal reacting tank 120. When the heat engine 100 is operated, the exhaust gas is generated by fuel combustion in the heat engine 100 and the generated exhaust gas is outputted through the outlet pipe 110. The exhaust gas is transferred to the removal reacting tank 120 and contacts calcium hydroxide in the removal reacting tank 120. Carbon dioxide in the exhaust gas is removed by the contact reaction. In addition, calcium hydroxide in the removal reacting tank 120 may be provided to the outlet pipe 110 prior to the removal reacting tank 120 through the extracting pipe 124 for pre-contact reaction such that the exhaust gas provisionally contacts calcium hydroxide in the outlet pipe 110 prior to the removal reacting tank 120 and mainly contacts calcium hydroxide in the removal reacting tank 120. The exhaust gas purified in the removal reacting tank 120 by removing carbon dioxide is outputted to exterior through the outlet pipe 110 posterior to the removal reacting tank 120.

The calcium carbonate sludge is generated and deposited in the removal reacting tank 120 in the removal reacting tank 120. The calcium carbonate sludge is transferred to and stored in the sludge storing tank 140 by the transferring means 130. The calcium carbonate in the calcium carbonate sludge may be outputted from the sludge storing tank 140 for recycling. The calcium carbonate sludge in the sludge storing tank 140 is provided to the decomposing tank 160 through the sludge transferring pipe 150.

The calcium carbonate sludge is decomposed by the heat of relatively high temperature from the heat engine 100 in the decomposing tank 160 to generate quicklime and carbon dioxide. The quicklime of the decomposing tank 60 is transferred to and stored in the resource material storing tank 180 through the first transferring pipe 170. In addition, the carbon dioxide of the decomposing tank 160 is transferred to and stored in the carbon dioxide collecting tank 210 through the third transferring pipe 200. The quicklime in the resource material storing tank 180 and the carbon dioxide in the carbon dioxide collecting tank 210 may be outputted to exterior for recycling. In addition, the carbon dioxide in the carbon dioxide collecting tank 210 may be transferred to the outlet pipe 110 through the fourth transferring pipe 220 and may be removed by the removal reaction. The quicklime in the resource material storing tank 180 may be transferred to the removal reacting tank 120 through the second transferring pipe 190 and may be used for generating calcium hydroxide.

The calcium hydroxide in the removal reacting tank 180 may be transferred to the auxiliary decomposing tank 240 through the fifth transferring pipe 230, and the calcium hydroxide may be decomposed in the auxiliary decomposing tank 240 by the heat of relatively high temperature from the heat engine 100 to generate quicklime and water. The quicklime in the auxiliary decomposing tank 240 may be transferred to and stored in the resource material storing tank 180 through the first transferring pipe 170, and the water in the auxiliary decomposing tank 240 may be outputted to exterior to be used as a hot water or for heating. Alternatively, the water in the auxiliary decomposing tank 240 may be provided to the removal reacting tank 120 to be reused for generating calcium hydroxide. Furthermore, new quicklime and new water may be added to the removal reacting tank 120.

In a system for reducing a carbon compound of a heat engine according to the present invention, consequently, since the carbon compound is effectively removed from the exhaust gas, atmospheric environmental pollution is prevented and regulation on carbon dioxide emission is satisfied. In addition, since resource materials are recycled and reused, consumption of the resource materials is reduced and economical efficiency is improved. Furthermore, since various valuable by-products such as calcium carbonate ($CaCO_3$), carbon dioxide ($CO_2$), calcium oxide (quicklime: CaO) and high temperature steam are obtained, utilization of materials is maximized and economical efficiency is further improved.

Although the strong alkaline solution including calcium hydroxide is generated using the quicklime of the resource material and the carbon dioxide is removed using the strong solution in the system according to the first and second embodiments of the present invention, the strong alkaline solution may include one of sodium hydroxide (NaOH) and potassium hydroxide (KOH) in a system according to another embodiment of the present invention.

It will be apparent to those skilled in the art that various modifications and variations can be made in a system for reducing a carbon compound of a heat engine of the present invention without departing from the spirit or scope of the invention. Thus, it is intended that the present invention cover the modifications and variations of this invention provided they come within the scope of the appended claims and their equivalents.

The invention claimed is:

1. A system for reducing carbon compound from heat engine exhaust, comprising:
   an outlet pipe transferring and outputting an exhaust gas from the heat engine;
   a removal reacting tank connected to the outlet pipe, the removal reacting tank generating a strong alkaline solution by a reaction of a resource material and water and removing the carbon compound from the exhaust gas by a contact of the carbon compound and the strong alkaline solution;
   a sludge storing tank storing sludge generated by a removal reaction in the removal reacting tank; and
   a decomposing tank generating the resource material for the removal reacting tank by decomposing the sludge from the sludge storing tank with heat;
   an extracting pipe transferring the strong alkaline solution of the removal reacting tank to the outlet pipe prior to the removal reacting tank such that the exhaust gas contacts the strong alkaline solution in the outlet pipe; and
   a transfer driving means supplying a transfer driving force such that the strong alkaline solution is transferred through the extracting pipe.

2. The system according to claim 1, further comprising a resource material storing tank storing the resource material from the decomposing tank and providing the resource material to the removal reacting tank.

3. The system according to claim 2, wherein the resource material storing tank includes a resource material outputting part for outputting the resource material.

4. The system according to claim 1, further comprising a carbon dioxide collecting tank storing a carbon dioxide generated by a decomposition reaction in the decomposing tank.

5. The system according to claim 4, further comprising a fourth transferring pipe through which the carbon dioxide in the removal reacting tank is transferred to the outlet pipe.

6. The system according to claim 1, wherein the strong alkaline solution is provided from the removal reacting tank to the decomposing tank and the decomposing tank generates the resource material and the water by decomposing the strong alkaline solution with a heat.

7. The system according to claim 1, further comprising an injecting nozzle subdividing and injecting the strong alkaline solution transferred through the extracting pipe into the outlet pipe.

8. The system according to claim 1, further comprising a transferring means transferring the sludge from the removal reacting tank to the sludge storing tank.

9. The system according to claim 1, wherein the removal reacting tank includes:

a water supplying part through which the water is supplied; and a resource material supplying part through which the resource material is supplied.

10. The system according to claim 1, wherein the removal reacting tank includes a contact rate improving means that improves a contact rate between the strong alkaline solution and the exhaust gas.

11. The system according to claim 10, wherein the contact rate improving means includes one of a rotating means for rotating the strong alkaline solution, a stirring means for stirring the strong alkaline solution, a gas subdividing means for subdividing and injecting the exhaust gas and an aerating means for aerating and injecting the exhaust gas.

12. The system according to claim 1, wherein the sludge storing tank includes a sludge outputting part for outputting the sludge therefrom.

13. The system according to claim 1, wherein the decomposing tank decomposes the sludge with heat from the heat engine.

14. The system according to claim 1, further comprising:
an auxiliary decomposing tank decomposes the strong alkaline solution from the removal reacting tank with heat to generate the resource material and the water; and
a fifth transferring pipe through which the strong alkaline solution is transferred from the removal reacting tank to the auxiliary decomposing tank.

15. The system according to claim 14, wherein the auxiliary decomposing tank decomposes the strong alkaline solution with heat from the heat engine.

16. A system for reducing carbon compound from heat engine exhaust, comprising:
an outlet pipe transferring and outputting an exhaust gas from the heat engine;
a removal reacting tank connected to the outlet pipe, the removal reacting tank generating a strong alkaline solution by a reaction of a resource material and water and removing the carbon compound from the exhaust gas by a contact of the carbon compound and the strong alkaline solution;
a sludge storing tank storing sludge generated by a removal reaction in the removal reacting tank;
a decomposing tank generating the resource material for the removal reacting tank by decomposing the sludge from the sludge storing tank with a heat;
a carbon dioxide collecting tank storing carbon dioxide generated by a decomposition reaction in the decomposing tank;
a third transferring pipe transferring the carbon dioxide generated by a decomposition reaction in the decomposing tank to the carbon dioxide storing tank; and
a filtering means in the third transferring pipe, the filtering means filtering the resource material and passing the carbon dioxide.

17. A system for reducing carbon compound from heat engine exhaust, comprising:
an outlet pipe transferring and outputting an exhaust gas from the heat engine;

a removal reacting tank connected to the outlet pipe, the removal reacting tank generating a strong alkaline solution by a reaction of a resource material and water and removing the carbon compound from the exhaust gas by a contact of the carbon compound and the strong alkaline solution;
a sludge storing tank storing sludge generated by a removal reaction in the removal reacting tank;
a decomposing tank generating the resource material for the removal reacting tank by decomposing the sludge from the sludge storing tank with a heat;
a carbon dioxide collecting tank storing carbon dioxide generated by a decomposition reaction in the decomposing tank;
a filtering means disposed in the outlet pipe posterior to the removal reacting tank, the filtering means filtrating and collecting the sludge from the exhaust gas; and
a bypass pipe transferring the sludge collected by the filtering means to the sludge storing tank.

18. The system according to claim 1, wherein the sludge is stored in the sludge storing tank in a sludge state or in a solid state by drying with heat.

19. The system according to claim 18, wherein the sludge is dried with heat from the heat engine.

20. A system for reducing carbon compound from heat engine exhaust, comprising:
an outlet pipe transferring and outputting an exhaust gas from the heat engine;
a removal reacting tank connected to the outlet pipe, the removal reacting tank generating a strong alkaline solution by a reaction of a resource material and water and removing the carbon compound from the exhaust gas by a contact of the carbon compound and the strong alkaline solution;
a sludge storing tank storing sludge generated by a removal reaction in the removal reacting tank;
a decomposing tank generating the resource material for the removal reacting tank by decomposing the sludge from the sludge storing tank with heat;
an auxiliary decomposing tank decomposes the strong alkaline solution from the removal reacting tank with a heat to generate the resource material and the water; and
a fifth transferring pipe through which the strong alkaline solution is transferred from the removal reacting tank to the auxiliary decomposing tank,
wherein the water of a vapor state generated by a decomposition reaction in the auxiliary decomposing tank is outputted for recycling to one of the removal reacting tank and an exterior.

21. The system according to claim 1, wherein the heat engine includes one of an internal-combustion engine, an external-combustion engine, a boiler and a flue.

22. The system according to claim 1, wherein the resource material includes quicklime, the strong alkaline solution includes calcium hydroxide, and the sludge includes calcium carbonate.

23. The system according to claim 1, wherein the strong alkaline solution includes one of calcium hydroxide, sodium hydroxide and potassium hydroxide.

* * * * *